Nov. 12, 1929.   J. P. CROWLEY   1,735,599
APPARATUS FOR SURFACING PLATE GLASS
Original Filed Aug. 27, 1923   5 Sheets-Sheet 1

INVENTOR
Joseph P. Crowley
BY C. A. Rowley
ATTORNEY

Patented Nov. 12, 1929

1,735,599

UNITED STATES PATENT OFFICE

JOSEPH P. CROWLEY, OF TOLEDO, OHIO, ASSIGNOR TO LIBBEY-OWENS GLASS COMPANY, OF TOLEDO, OHIO, A CORPORATION OF OHIO

APPARATUS FOR SURFACING PLATE GLASS

Application filed August 27, 1923, Serial No. 659,435. Renewed February 18, 1927.

This invention relates to improvements in the art of producing polished plate glass, and more especially to a machine for grinding or polishing single sheets of glass of standard size. The machine forming the subject matter of this application is designed to automatically carry out the improved process of surfacing sheet glass, which is disclosed and claimed in my copending application, Serial No. 654,091, filed July 27, 1923.

When this invention is used, the factory will usually be equipped with a number of similar machines, part of them being grinders and the remainder being polishers, one machine usually operating on only a single sheet of glass at any one time. Contrary to the usual practice, this sheet is not plastered down on the supporting table, but is merely laid loosely in a shallow recess in the table top, the recess preferably being symmetrically positioned over the center of rotation of the table. After the sheet has been placed in position, the action of the machine is almost entirely automatic. The grinding tool is lowered onto the sheet on the revolving table, and the opening giving access to the sheet and table is automatically closed. The weight of the grinding head is carried by the glass sheet and serves to position the sheet firmly within the recess in the table top, and hold it in this position during the grinding operation. The abrasive is automatically fed to the grinding tool in progressively finer grades. At the expiration of the time set for grinding the sheet, the grinding tool is raised, the table ceases to rotate, and the door giving access to the sheet is opened. The operator may now remove the sheet and turn it over and the process will be repeated on the other side of the sheet. In this way, the sheet will be completely ground on both sides before it is carried over to the polishing machine.

The polishing machines are in many respects quite similar to the grinders, the principal differences being that polishing heads are substituted for grinding heads, and a rouge feeder is substituted for the abrasive feeder used on the grinder. The ground sheets are successively polished first on one side and then on the other.

One object of the present invention is to provide automatic machines for performing the cycle of operations outlined above.

Another object is to provide a compact machine comprising a shielding casing which protects the workmen and adjacent objects from flying abrasive or rouge and possible broken glass or metal. This casing includes a door or closure giving access to the sheet when the machine is idle, but which is automatically closed while the machine is in operation.

Other objects and advantages of this invention will become apparent from the following detailed description of certain approved forms of the apparatus.

In the accompanying drawings:

Fig. 8 is a vertical section on an enlarged scale, through the timing mechanism, and the driving connections therefor.

The supporting frame comprises upper and lower central bearings 1 and 2 for the rotatable vertical column 3 of the sheet-supporting table 4. Surrounding the column 3 near its upper end is a stationary roller raceway 6 which is attached to the lower face of table 4. Between the bearing races 5 and 6, is an annular series of roller bearings 7 supporting the weight of the table 4 and parts carried thereby. The downwardly tapered central portion 8 of the frame which supports the lower bearing 2 forms a reservoir for the lubricating oil. Oil from this reservoir is pumped to the various parts and flows back into this reservoir as usual in similar machines. To avoid complicating the drawing, the lubricating system has not been illustrated.

Figure 3:
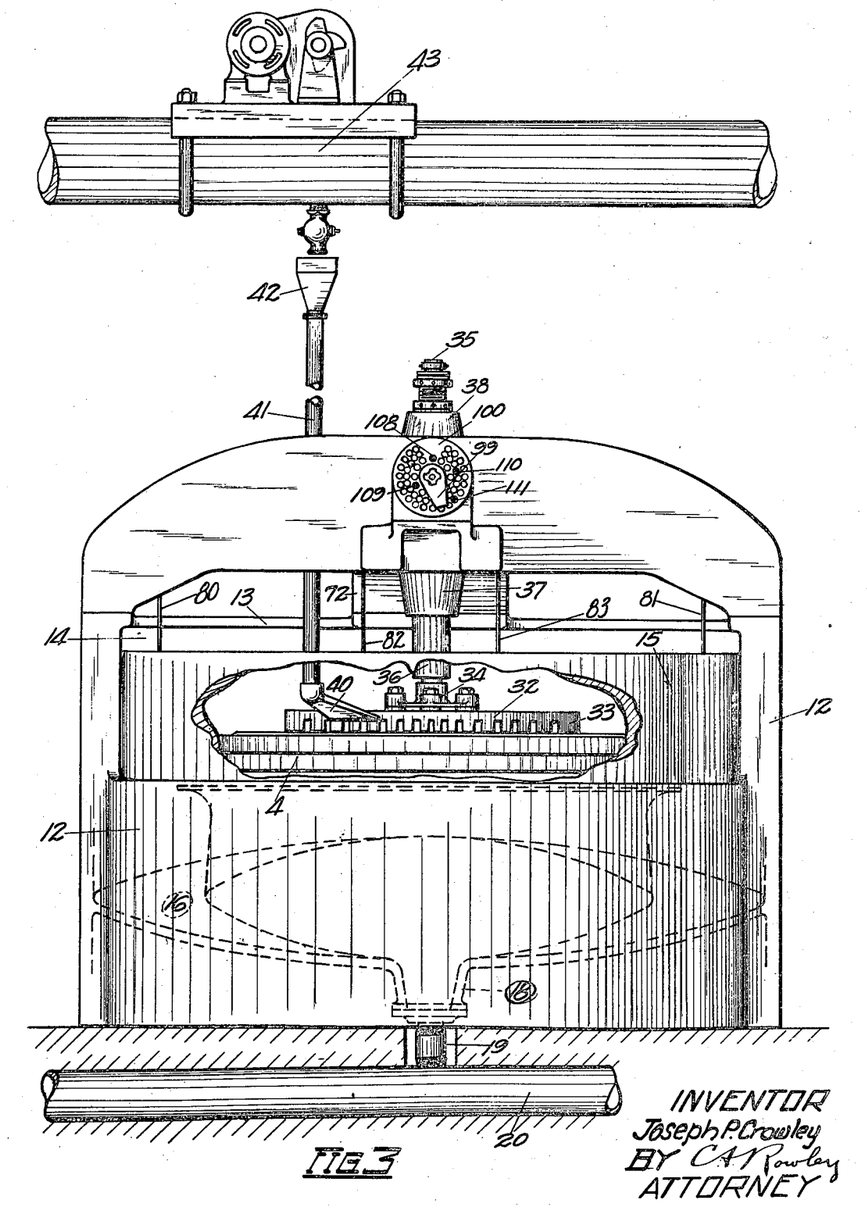
Fig. 3 is a front elevation of the grinding machine, also showing portions of the abrasive feeding system used with this machine.

The outer portion of the supporting and closing frame comprises an inner vertical cylindrical wall 9 flaring outwardly as at 10 beneath the lower edge of table 4. The rotating table has a downwardly extending flange 11, which cooperates with the flaring wall 10 to prevent flying abrasive or other foreign substances from gaining access to the bearing mechanism beneath the table. The frame also comprises an outer vertical cylindrical wall 12 of greater diameter than the table 4 and extending considerably thereabove to form a closing wall and shield around the rotating parts of the apparatus. This outer wall flares inwardly at its upper edge above the table 4 as at 13. Certain portions of this wall 12 are cut away as at 14, to form openings giving access to the table top and mechanism thereabove. A vertically slidable shield or closure 15 is positioned just inside of the outer wall 12. As here shown, this closure 15 is in the form of a ring or collar completely surrounding the table and somewhat smaller than the cylindrical wall 12, so that it may be moved vertically within this enclosing wall. When this closure 15 is elevated to the position shown in Figs. 1, 2 and 3, it closes the openings 14 and together with the vertical wall 12 substantially encloses all of the rotating parts so that no flying liquid, abrasive, or possible broken glass or metal can be thrown horizontally from the table top. The closure 15 is automatically raised when the grinding operation is commenced and automatically lowered away from the openings 14 when the grinding operation is completed, by mechanism that will be described hereinafter. A connecting rib 16 between the spaced cylindrical walls 9 and 12, slopes downwardly in both directions from its highest point 17 at the rear of the machine, to a drainage spout 18 at the front of the machine. This rib 16 forms the bottom, and the parallel cylindrical walls 9 and 12, form the sides, of a drainage channel which catches the water, abrasive and ground glass thrown off from the table 4 against the surrounding closure 15. This material flows from spout 18 through pipe 19 to the drain pipe 20 located beneath the machine. From pipe 20, the used abrasive and other material flows to a sump common to all of the machines.

A large bevel gear 21 is keyed to the central column 3 between the bearings 1 and 2. This gear 21 is rotated by bevel pinion 22 on shaft 23 mounted in a supporting frame and driven through reducing gears 24 by motor 25. When motor 25 is energized, the table 4 will be continuously rotated in a horizontal plane, the table being supported on the roller bearings 7 and held firmly against lateral play by large central column 3.

The table 4 is round, but carries on its upper face a flat square sheet-supporting member 26, whose center, in the construction here shown, coincides with the center of the table. This supporting member need not necessarily be square, but should substantially conform to the contour of the sheet to be surfaced on this machine. This supporting member 26 is preferably constructed of heavy metal so as to be absolutely rigid, and its upper surface is ground as closely as possible to an absolute plane, so as to serve as a "master" surface or pattern for the glass sheet which is supported thereon. Surrounding the square central member 26 are a series of four sectors 27, also secured to the top of table 4, and whose upper faces 28 project somewhat higher than the upper surface of the supporting member 26, so that a square sheet-receiving recess or depression is formed on the top of the table. A sheet-supporting pad of suitable yieldable material 29 covers the upper face of member 26. The material best adapted for this purpose is cork or a cork composition. This pad should be of absolutely even thickness so that the master surface on supporting member 26 will be repeated on the upper supporting surface of the cork pad. The walls of the recess are outlined by vertical strips 30 of yieldable material, such as rubber. The recess, the bottom of which is the pad 29 and the walls of which are determined by the yieldable strips 30, conforms to but is slightly larger than, the glass blank 31 to be surfaced. The upper surfaces 28 of side sectors 27, and yieldable edge members 30, project above the cork pad 29 a distance somewhat less than the thickness of the glass blank 31, so that the grinding tool hereinafter described, will never contact with the side portions 28 or 30 of the table.

Figures 4, 5:
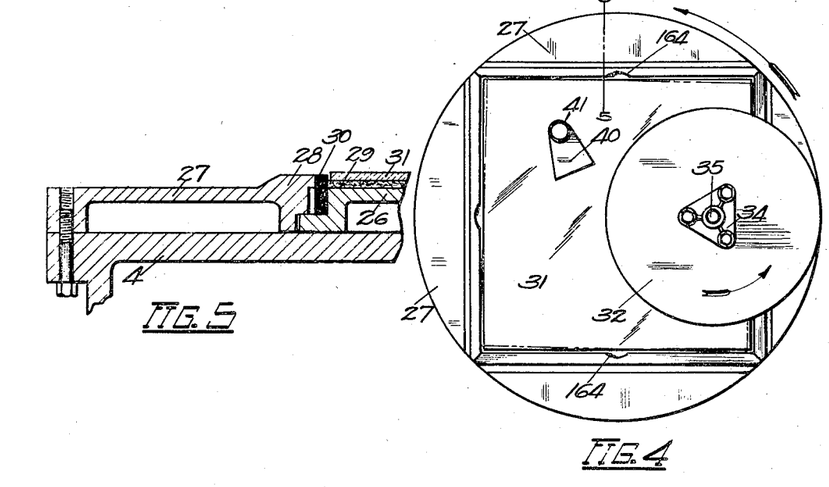
Fig. 4 is a plan view of the sheet-supporting table for the grinding machine, portions of the grinding tool, and the abrasive feeder also being shown.
Fig. 5 is a partial vertical section on an enlarged scale, taken substantially on the line 5—5 of Fig. 4.

The grinding head 32 is of standard design, its lower face comprising a series of flat teeth or projections 33 which, aided by suitable abrasive, perform the grinding operation on the sheet. While sheets are being placed in or removed from the machine, this grinding head is elevated above the table, but when in operation the weight of the grinding head rests upon and is entirely supported by the sheet of glass 31. Grinding head 32 is connected through spider 34 with the lower end of vertical shaft 35 which turns freely in the non-rotatable sleeve 36. This sleeve 36 is vertically movable, by mechanism described hereinafter, through bearings 37 and 38 in the upper frame-work of the machine. Between the legs of spider 34 and the upper face of head 32 are rubber washers or springs 39, allowing a small universal tilting movement between the grinding head and the shaft 35 so that the head may temporarily accommodate itself to unequal elevations in the glass sheet 31. The axis of shaft 35 is considerably offset from the axis of the column 3 and table 4, as shown more particularly in Figs. 1 and 4. As the table is rotated in the direction of the arrow, Fig. 4, the grinding head 32 will also be rotated in the same direction through its frictional engagement with the surface of the glass sheet. The head is of such diameter that its operating face will work upon the corners of the sheet as well as the centers thereof.

Abrasive is fed to the upper surface of the sheet, and directed beneath the grinding head 32, from the delivery spout 40 at the lower end of pipe 41, which leads down from a basin or hopper 42 mounted conveniently above the machine. The desired grades of abrasive are successively delivered to the receiving hopper 42 from a suitable abrasive distributing system indicated generally at 43 in Fig. 3 of the drawings. While any suitable system for delivering the abrasive mixture may be used with these machines, a preferred mechanism for automatically distributing this abrasive is disclosed and claimed in my copending application, Serial No. 659,436, filed August 27, 1923. The used abrasive, water, and ground glass, which are thrown from the grinding table 4 and grinding tool 32 by centrifugal force are caught by the surrounding shield or closure 15, and outer wall 12, from which they drain through channel 16 and spout 18 to the drain pipe 20 already described. From pipe 20 this mixture is conducted to a sump or collecting-well, from which the better part of the abrasive is preferably withdrawn, regraded, and carried back to the machines for further use. A system for carrying out these latter operations is also disclosed in my copending application referred to above.

Figures 1, 2:
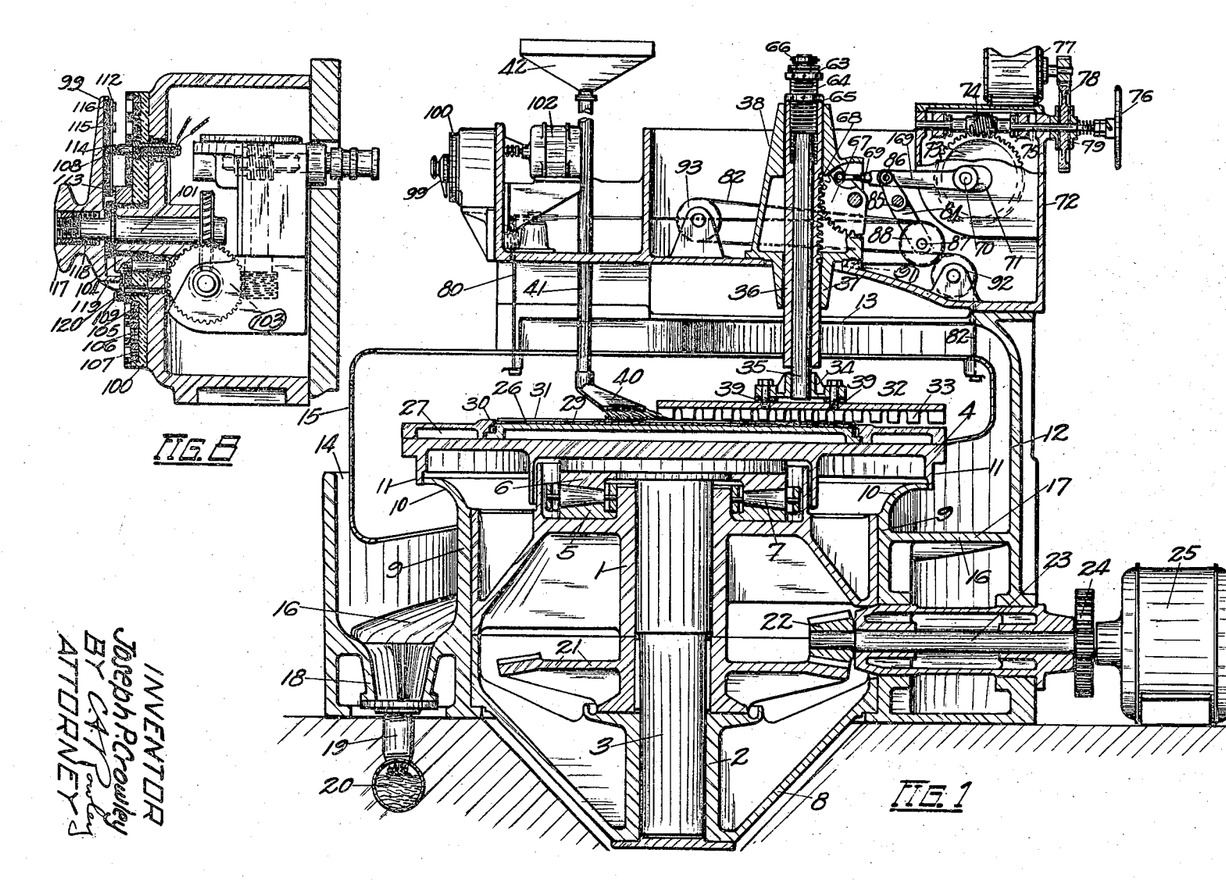
Fig. 1 is a vertical central section through the grinding machine.
Fig. 2 is a side elevation of a polishing machine, the upper portion being shown in vertical section.
Figure 6:
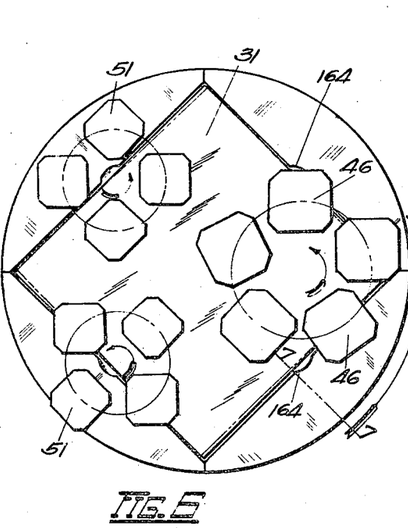
Fig. 6 is a plan view of the polishing table.
Figure 7:
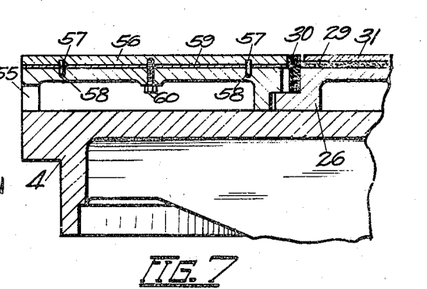
Fig. 7 is a partial vertical section on an enlarged scale, taken substantially on the line 7—7 of Fig. 6.

Many parts of the polishing machine, indicated in Figs. 2, 6 and 7, are the same as similar portions of the grinding machine already described, and the following description of the polisher will be limited to those features peculiar to the polishing machine. A series of polishing heads 44 suspended freely from spider 45 replace the grinder 32 previously described. Each polishing head comprises a felt pad 46 secured to a weighted block 47, which is mounted freely by universal joint 48 at the lower end of a pin 49, vertically slidable through an arm of the spider 45. As here shown, a series of five of these polishing heads are symmetrically arranged about the axis of the spider. Spider 45 is secured to the lower end of vertical shaft 50 which rotates freely in the supporting sleeve 36, which is an exact duplicate of the sleeve 36 previously described in connection with the grinding machine.

Since the single series of polishing heads just described is sometimes insufficient to properly polish the corners of the square sheet, two or more auxiliary polishing units may be added. As here shown, each of these auxiliary units comprises four pads 51 which travel in an orbit somewhat smaller than that of the five main polishers first described. These auxiliary polishing heads are carried by smaller spiders 52, mounted at the lower ends of shafts 53, freely rotatable in bearing sleeves 54. Shafts 53 and supporting sleeves 54 are in all respects identical with the shaft 50 and sleeve 36 already described.

It will be noted from Fig. 6 that the smaller polishing pads 51 pass completely off from the glass sheet when in the outer portions of their orbits. It is therefore essential that these polishing pads be supported while off from the glass sheet and that they be guided evenly onto and off from the sheet, in order to avoid damaging either the polishing pads or the edges of the glass sheet. To accomplish this, the upper faces of the side sectors 55 of the polishing table are formed of smooth metal plates 56. Preferably a hard metallic alloy, such as nichrome, capable of receiving and retaining a highly polished surface, is used. These plates 56 are so mounted that their upper surfaces lie in the same horizontal plane as the exposed upper face of the ground glass blank 31, when placed within the sheet receiving recess.

Since the ground glass blanks to be polished on one of these machines will ordinarily be of a uniform standard thickness, the plates 56 may ordinarily be designed of a proper thickness and fastened permanently in place on the supporting side sectors 55. However, to adapt these machines for polishing different thicknesses of plate glass, any suitable means for vertically adjusting the plates 56 may be adopted. As shown in Fig. 7, each plate 56 is provided with a series of dowels 57 fitting recesses 58 in the sectors 55. One or more suitably perforated thin shims 59 may be inserted between the polished plate 56 and the supporting sector 55, after which the plate and shims are secured in position by the screw bolts 60. By varying the number of shims used, the plane of the upper tool supporting surface of plates 56, may be made to conform exactly with the tool supporting surface of the glass blank 31 which is to be polished. Of course, the adjustment mentioned above need only be made at such times as the standard thickness of glass plates to be polished is changed.

A mixture of rouge and water is fed to the polishing machine through pipe 61 from hopper or basin 62 above the machine. The rouge may be delivered to receiving hopper 62 by any suitable mechanism (not shown), preferably one similar to that already described in connection with the grinding machine.

Means are provided to automatically lift the grinding or polishing heads away from the glass sheet when a surfacing operation is completed, and to automatically lower these heads onto the next sheet surface prior to the succeeding operation. Referring first to the grinding machine, shown in Fig. 1, it will be noted that a roller thrust-bearing 63 is carried at the upper end of collar 64, screwed adjustably into the upper end of supporting sleeve 36 and held in adjusted position by the lock nut 65. Secured to vertical shaft 35 is a collar 66 which, when the grinding head 32 is in operative position, is spaced slightly above the thrust-bearing 63, so that shaft 35 turns freely within the sleeve 36 and collar 64, with its entire weight, and the weight of the grinding tool, resting upon the glass sheet. When bearing sleeve 36 is elevated, by the mechanism about to be described, collar 66 on shaft 35 will engage with the upper raceway of roller-bearing 63, and the grinding head and shaft will be elevated along with sleeve 36, the roller-bearing 63 allowing the shaft and head to continue to rotate within the supporting sleeve.

Gear sector 67, mounted in the upper frame-work of the machine, meshes with rack 68 formed along one side of the sleeve 36. Gear sector 67 is connected by the adjustable link 69, and pitman 169, with the crank-pin 70 of crank-shaft 71, mounted in the upper rear portion of the frame 72 of the machine. Secured to crank-shaft 71 is a worm wheel 73 meshing with worm 74 on drive-shaft 75. This shaft 75 may be rotated manually by the removable hand-wheel 76 at one end thereof, but the shaft is normally rotated from motor 77 through reduction gearings 78, and the friction clutch connection 79. This latter connection will allow for slippage when necessary to avoid stripping gears. When the parts are in the position shown in Fig. 1, the collar 66 is unsupported by the cage of roller-bearings 63 and the entire weight of the grinding head rests upon the glass sheet. When motor 77 is energized and the gear 73 and crank-shaft 71 are rotated through 180°, sleeve 36 will be elevated through the rack and pinion connections 67 and 68, and through collar 66 and roller-bearing 63 the grinding head 32 will be elevated from the grinding table and the glass sheet 31 a sufficient distance to allow ample clearance for removing sheet 31 and reversing same, or inserting a new sheet.

Figures 2, 12:
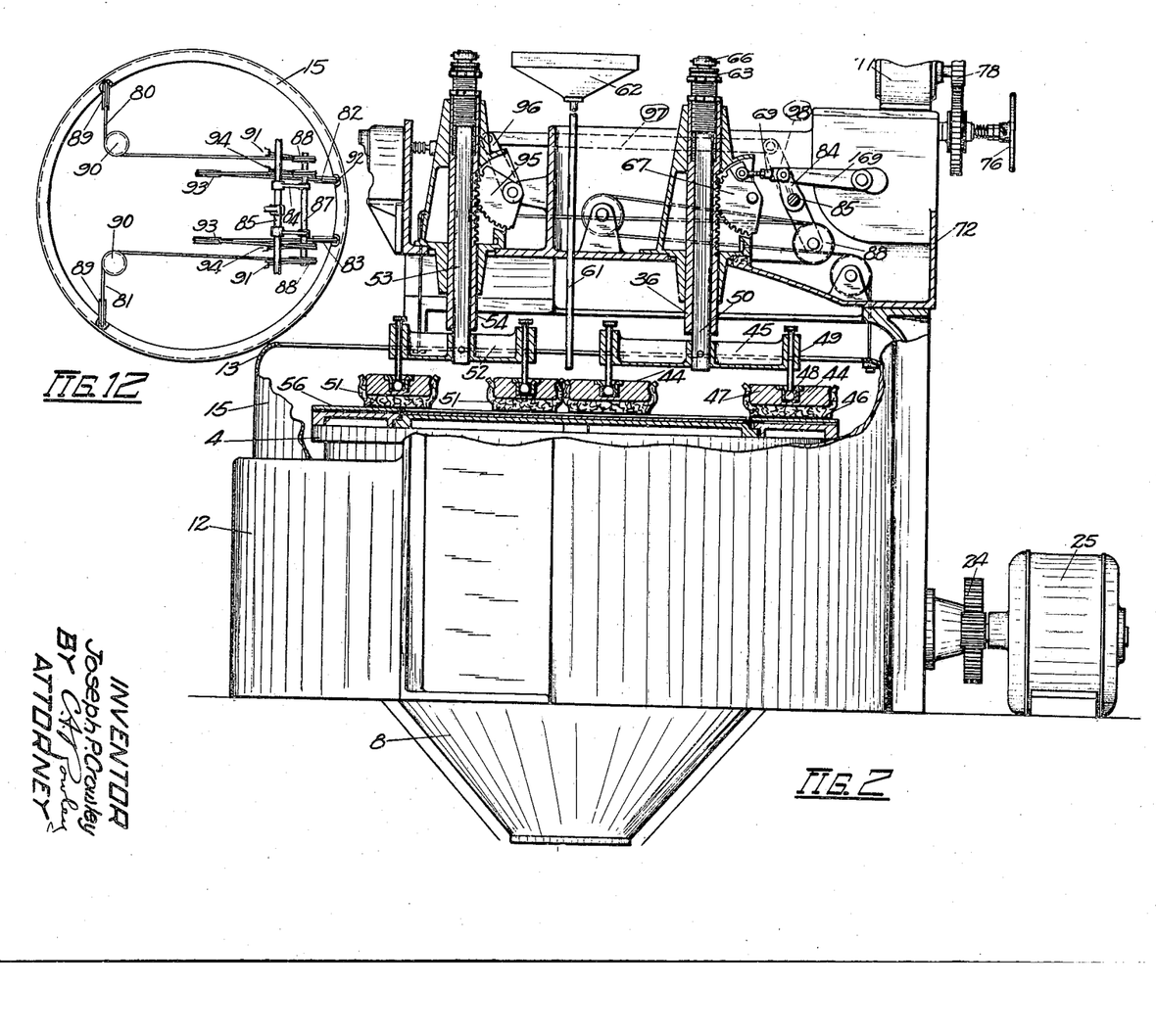
Fig. 12 is a plan on a smaller scale, with parts broken away, showing the supporting and lifting cables for the closure.

Supporting means are provided for the enclosing shield or closure 15, whereby this closure is elevated to operative position when the grinding or polishing heads are lowered upon the sheet, and is lowered out of the way to permit access to the sheet when the grinding or polishing heads are raised above the sheet and the surfacing operations are discontinued. As shown in Figs. 1, 2 and 12, the shield 15 is suspended from four cables 80, 81, 82 and 83. A lever 84 pivoted at 85 in the upper frame-work of the machine has its upper end connected at 86 with pitman 169. A horizontal cross-shaft 87 at the lower end of lever 84 carries a series of four similar spaced cable-sheaves 88. The supporting cables 80 and 81, secured to opposite sides of shield 15 near the front of the machine, pass up over direction pulleys 89 and 90, thence back around the outer pair of cable sheaves 88, and have their other ends anchored to the upper frame-work 72 of the machine as at 91. The cables 82 and 83 which support the rear portion of shield 15 pass up over direction pulleys 92, thence forward around direction pulleys 93, back around the inner pair of cable sheaves 88 and are anchored to the machine frame-work at 94. It will be noted that when pitman 169 is moved backward and forward by crank-arm 71 to operate the elevating gear sector 67, levers 84 will simultaneously be swung about their pivot 85 and a horizontal swinging movement imparted to the cable-sheaves 88. When pitman 169 moves to the left, Fig. 1, to lower the grinding head 32 upon the sheet, the cable-sheaves 88 will simultaneously be swung to the right. This will lengthen the cable loops passing around these sheaves and draw up the cables 80, 81, 82 and 83, elevating the shield 15 to the operative position shown in Fig. 1. Conversely, when pitman 169 is moved to the right, Fig. 1, to elevate the grinding tool away from the sheet, sheaves 88 will be swung to the left. This will decrease the length of the cable loops passing around these sheaves and the resulting slack in the supporting cables 80 to 83 will allow the shield 15 to be lowered into the lower frame-work of the machine and permit free access to the upper surface of the table and the glass sheet supported thereon. It will be noted that the supporting arrangement is such that the grinding tool operates as a counter-weight for the shield 15, and vice versa. An exactly similar arrangement is used for operating the shield 15 on the polishing machine.

The vertical shafts 53 and supporting sleeves 54 for the auxiliary polishing heads, are provided with elevating mechanism exactly similar as that already described in connection with the grinding head 32 and the main polishing heads 44. The gear sectors 95 for elevating the auxiliary polishers are connected through lever arms 96, links 97, and lever arms 98, with the shaft 85 of lever 84. Through these connections the two sets of gear sectors 67 and 95 will be simultaneously and equally operated at all times.

Mounted in a convenient position at the front of the machine is a controller arm 99 pivoted centrally on a timing dial 100, see Figs. 1, 3, 8 and 9. Controller 99 is frictionally secured to the outer end of a shaft 101, and this shaft, together with the controller arm 99, is adapted to be slowly rotated in a clockwise direction around the face of dial 100 by means of the small electric motor 102, which is geared to shaft 101 through a suitable train of reduction gears 103. Centrally fixed to the timing dial around the shaft 101, but suitably insulated therefrom, is a contact ring 104. Also mounted in the dial concentrically with shaft 101 and with each other, are a series of three contact rings 105, 106 and 107. Fixed in the face of dial 100 in the circle about shaft 101 occupied by ring 105, but insulated from this ring, is a contact pin 108 which projects outwardly from the face of the dial. Each of the contact rings 105, 106 and 107, is provided with a series of spaced holes or sockets in which adjustable contact pins 109, 110 and 111 are adapted to be interchangeably secured. The contact pins 108, 109, 110 and 111, are all of similar size and their outer contact faces all lie in the same plane parallel with the face of dial 100. A contact bar 112 secured to the rear face of controller arm 99, comprises contact member 113 which slides at all times in electrical contact with the central ring 104. A second contact 114 on bar 112 is adapted to contact with either of the pins 108 or 109. Similar contacts 115 and 116 on bar 112, are adapted to make electrical connection with the pins 110 and 111, respectively, as the controller arm passes thereover. If the operator grasps the knob or handle 117 on controller arm 99 and pulls same outwardly against the spring 118 mounted within the controller, the arm 99 may be manually turned counter-clockwise to the starting position, in which the arm projects vertically upward and a stop 119 at the lower side of arm 99 contacts with a stop pin 120 mounted in the dial. At this time, when knob 117 is released, and spring 118 allowed to expand the contact 114 on controller arm 99 will be above and make contact with the starting pin 108. As the controller arm 99 is slowly rotated around the face of the dial in a clockwise direction, the contact 113 on this arm is continually in connection with the central ring 104, and the contacts 115, 116 and 114 on this arm will successively make contact with the pins 110, 111 and 109, which have been adjustably positioned on the face of the timing dial.

Figures 9, 10, 11:
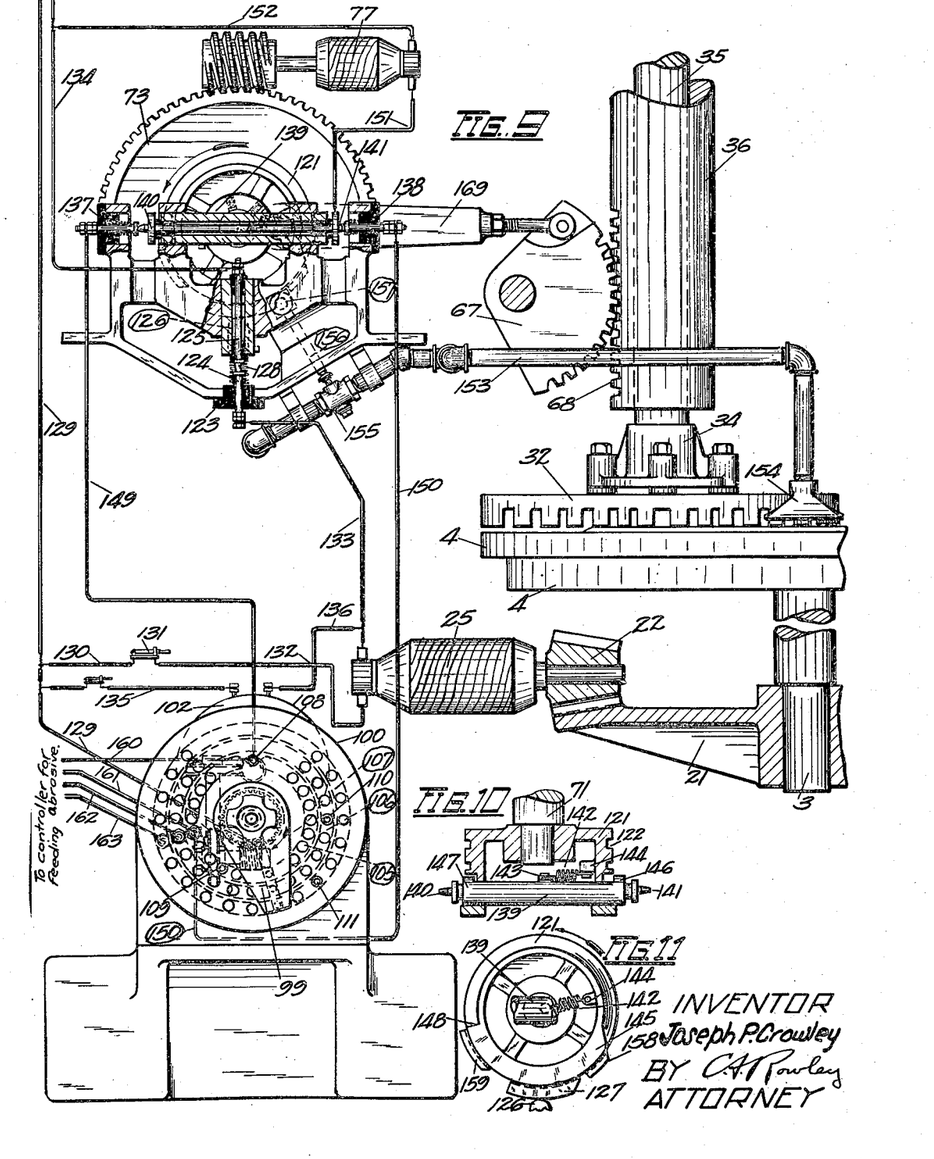
Fig. 9 is a general wiring diagram showing portions of the timing switches in vertical section.
Fig. 10 is a horizontal section through the cam-carrying drum.
Fig. 11 is a front elevation of this drum showing some of the cams used in the timing mechanism.

Secured adjacent one end of shaft 71 which carries and is driven by the worm gear 73 of the head-raising mechanism, is a cam-carrying drum 121, see particularly Figs. 9, 10 and 11. In the periphery of this drum are a series of slots 122 in which are adjustably secured certain cam members, hereinafter described. Mounted somewhat below and adjacent the outer end of this drum is a main switch 123, of the plug type, comprising a fixed socket member 124 and a vertically movable plug member 125. A cam or projection 126 secured to the rear of the plug member 125 is adapted to be forced downwardly by cam member 127 carried by drum 121, against the action of a spring 128, which tends to normally hold this switch in open position. As shown in Figs. 9 and 11, the plug has been forced down by the cams against the action of spring 128, and the switch is closed. A circuit is established from the positive main through wires 129, 130, emergency switch 131, wire 132, table operating motor 25, wire 133, to the socket member 124 of switch 123, and plug member 125 of this switch is connected by wire 134 to the negative main. When this switch 123 is closed, a circuit is established through the motor and the grinding operation takes place. A second circuit runs from the positive main through wires 129 and 135, dial operating motor 102, wire 136, wire 133, switch 123, and wire 134, to the negative main. By means of this shunt circuit, the dial operating motor 102 is energized or de-energized simultaneously with the main table-operating motor 25.

A pair of similar plug switches 137 and 138 are arranged at either side of drum 121 and between these switches is positioned a horizontally reciprocating member 139, carrying at its ends the plug member 140 of switch 137 and the plug member 141 of the switch 138. The member 139 is of such length that only one of the switches 137 or 138 may be in closed position at any one time. A tension spring 142 is connected at one end to a lug 143 centrally positioned on the back of reciprocating member 139, and at its other end is secured to a lug 144 on the inner periphery of drum 121. With the parts in the position shown in Figs. 9, 10 and 11, this spring 142 will hold the sliding member 139 to the right so that switch 138 will be closed. At the outer edge of drum 121 is a cam 145 which is adapted to alternately engage behind shoulders 146 and 147 adjacent the two ends of sliding member 139. This cam 145 is somewhat less than 180° in length and terminates at its rear end 148 at a point diametrically opposite the lug 144, to which one end of spring 142 is attached. With the parts in the position shown in Figs. 9, 10 and 11, if the drum 121 is rotated in a counter-clockwise direction as indicated by the arrows, the outer anchorage 144 for spring 142 will be carried up over the central position so that it no longer tends to hold the sliding member 139 to the right, but now tends to pull same over to the left. However, before spring 142 has passed over to this new position, cam member 145 has moved up behind the shoulder 146 on sliding member 139 so that the switch 138 is held closed by this cam despite the fact that the spring 142 now tends to break the contact at this point. When drum 121 is turned through one-half revolution, or 180°, from the position shown in the drawings the rear end 148 of cam 145 will pass out from behind shoulder 146, and spring 142 will now snap the sliding member 139 over to the right breaking contact in switch 138 and closing switch 137. A further 180° movement of drum 121 will exactly duplicate this operation in the opposite direction breaking contact in switch 137 and reestablishing contact at switch 138. The socket member of switch 137 is connected with starting pin 108 of the timing dial by wire 149. The socket member of switch 138 is connected with contact ring 105, and consequently with stop pin 109, by wire 150. The movable plug members of switches 137 and 138, mounted on sliding member 139, are connected by wire 151 with one side of the head-raising motor 77, the opposite side of this motor being connected by wire 152 with the negative main. Wire 129, from the positive main, leads to contact ring 104 of the timing dial.

In order to flood the top of the table and glass sheet with water at suitable intervals, to wash away the collected abrasive and ground glass, water pipe 153 leads from any suitable source of supply to suitable ejectors 154 above the table top. A valve 155 in supply pipe 153 is controlled through push rod 156. A roller 157 at the outer end of this rod is adapted to be engaged by cam sectors 158 and 159 positioned at suitable intervals on the periphery of cam-carrying drum 121.

Electrical connections 160, 161, 162 and 163, lead from starting pin 108 and contact rings 105, 106 and 107, respectively, to a controller for automatically feeding the different grades of abrasive to the grinding mechanism. This controller is not illustrated in the present disclosure, but is shown and described in my copending application, Serial No. 659,436, referred to above.

With the parts in the position shown in Fig. 9, the machine is in operation and the grinding operation is nearly completed. Controller arm 99 is being slowly rotated in a clockwise direction by the dial-operating motor 102. When this arm 99 has moved through an arc of about 30° from the position shown, the projection 114 on the controller arm will make contact with stop pin 109. A circuit will then be established from the positive main through wire 129, contact ring 104, contact 113, bar 112, contact 114, pin 109, ring 105, wire 150, switch 138, wire 151, through head-raising motor 77 and wire 152 to the negative main. Motor 77 will now rotate worm wheel 73, drum 121, and crankshaft 71 in a counter-clockwise direction. The rotation of crank-shaft 71 will elevate the grinding head 32 from the table and will lower the protecting shield 15. Cam 127 will be moved away from the cam member 126 allowing spring 128 to open the main switch 123, which will break the circuit through main motor 25 and allow the grinding table to cease rotating. Cam member 159 will engage with roller 157 on rod 156, opening valve 155 and flooding the table top with water to wash away the accumulated abrasive and ground glass from the ground surface of the sheet 31. When worm wheel 73 and shaft 71 have rotated through 180°, cam 148 will run out from behind the lug 146 on reciprocating member 139, allowing spring 142 to break the contact at switch 138 and close switch 137. This will de-energize motor 77 and the rotation of shaft 71 will cease. This will leave the grinding head 32 in raised position with the shield 15 lowered to permit access to the glass sheet and table top. Cam 159 will have passed out from behind roller 157 and the flooding of the table top will have ceased. Switch 123 is now open and motors 25 and 102 are de-energized so that all of the movable portions of the mechanism are at rest.

When a new grinding operation is to be started, controller 99 is moved manually by means of knob or handle 117 in a counter-clockwise direction, until contact is established between pins 114 and 108, as illustrated in Fig. 8 of the drawings. A circuit will now be established from the positive main through wire 129, ring 104, plate 112, pin 108, wire 149, switch 137, wire 151, motor 77, and wire 152, to the negative main. Motor 77 will now rotate the worm 74 and shaft 71, and the parts carried thereby, through another 180°. The head 32 will be lowered onto the glass sheet and shield 15 raised to protecting position about the table. Simultaneously, the cam 158 will operate the water valve 155 to wash off the sheet now in grinding position prior to the grinding operation, and cam 127 will engage with member 126 and close the main switch 123, energizing motor 125, rotating the table 4 and glass sheet carried thereby beneath the grinding head 32. Simultaneously, motor 102 will be energized and the controller arm 99 will be slowly rotated in a clockwise direction about the dial 100. Another circuit will be established from starting pin 108 through wire 160 to the abrasive controller, whereby the heaviest grade of abrasive will be fed to the table top through pipe 41 and spout 40. As the controller arm moves around the dial contacts will be successively established through pins 110 and 111, and wires 161 and 162, with the abrasive controller to successively feed different, finer grades of abrasive to the table at succeeding stages of the surfacing operation. When arm 99 has reached the stop pin 109, the operation of the machine will be stopped as has already been described. At the same time a circuit will be established from pin 109 through wire 163 to the abrasive controller for shutting off the grade of abrasive last supplied to the table. The length of the clockwise arc between pins 108 and 109 determines the total grinding time, and the arcs between pins 108 and 110, 110 and 111, and 111 and 109, determine the proportionate parts of this time during which the three different grades of abrasive are used. The movable pins 109, 110 and 111 may be placed in any desired holes in the rings 105, 106 and 107 to vary these times as desired.

Figure 13:
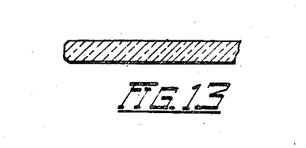
Fig. 13 is a fragmentary section of the glass blank, to illustrate the beveled edges.

A supply of square glass blanks 31 to be surfaced on these machines, is produced in any suitable manner, and the edges of each of these blanks are slightly beveled off, as shown on a somewhat exaggerated scale in Fig. 13 of the drawings. The reason for beveling the sheets is to avoid chipping or fracturing the edge portions of the sheet as portions of the grinding tool run on and off the sheet edge.

One of these blanks is laid loosely, directly upon the pad 29 in the recess. When the machine is started by manipulating the controller 99, as already described, the head 32 is lowered upon the sheet on the rotating table 4. The slight shifting movement allowed the sheet within the over-size recess will permit the sheet to seat itself firmly and evenly upon the master supporting surface under the weight of the grinding tool. Usually, the sheet will slightly shift within the recess, and wedge itself adjacent its corners against the yielding side strips or abutments 30, as indicated in dotted lines in Fig. 4. The unground sheet surface first presented to the supporting table is not absolutely flat, but has minor surface irregularities (else the surfacing operation would usually be unnecessary). The cork pad 29 is sufficiently yieldable to conform to these slight variations from a plane surface, and provide a continuous, even, supporting surface for the sheet, without necessitating any springing or warping of the glass sheet. With the square recess arranged substantially symmetrically over the axis of the table as here shown, there is very little tendency for the sheet to be thrown from the table when rotating, since the center of gravity of the sheet will lie substantially in the axis of rotation of the table. The frictional contact of sheet 31 with the supporting pad 29, in combination with the wedging action of the sheet against portions of the side walls or abutments 30, is sufficient to hold the sheet firmly against lateral shifting movement after the surfacing operation is once under way. The sheet is held down against the master supporting surface by the weight of the grinding head 32, aided to some extent by the binding action of the edge strips 30. The stop pin 109 on the timing dial will be so positioned that the machine will be automatically stopped, and the grinding head 32 raised, when the surfacing operation is completed on the upper side of the sheet, and the surface is absolutely flat and of the requisite smoothness for polishing. The sheet is now lifted from the recess, portions of the side walls and bottom of the recess being cut away at intervals as at 164, to permit the operator to grip the sheet edge. The sheet is lifted out, turned over, and relaid in the recess with the unground surface now uppermost, after which the controller 99 is again returned to starting position to begin a new grinding operation. During this second grinding operation, the already ground flat face of the sheet rests upon the cork pad, which does not yield locally, in this instance, but retains its plane master supporting surface. Hence, when the surface of the second face of the sheet, now uppermost, is completed, the two sheet faces will be absolutely parallel with the master surface, and with each other, and the glass plate will have an absolutely uniform thickness.

After the sheet is ground on both faces, the ground glass blank is transferred to one of the polishing machines where it is laid loosely in the recess of the polishing table, and the machine started as already described in connection with the grinder. The polishing tools 44 and 51 will be lowered onto the sheet and will serve to seat the sheet within the recess, and hold it firmly in place, in much the same manner as described in connection with the grinding machine. The weight of these polishing tools is carried by the sheet, except when they pass off from the sheet edges and rest upon the side plates 56, as already described. As is usual with machines of this general type, a mixture of rouge and water is fed to the contacting surface of the polishers and the glass blank, during the polishing operation.

After one face of the sheet is polished, it is turned over and the other side polished as was done in the grinding operation. The completed sheets are removed, washed, and cut into the desired sizes.

A plurality of separate individual recesses, similar to the one here disclosed, might be arranged upon a single table top, to simultaneously surface several smaller sheets instead of one larger one. However, the forms of machines here shown are preferable. Since the factory installation includes a large number of these machines, different groups of machines may be provided for different sizes of glass sheets.

It will be noted that each machine used is simple and compact, and the parts are largely interchangeable. Many parts of the grinder and polisher are identical, and most of these parts may be used on either machine.

The almost entirely automatic operation of these machines makes it possible to run a large number of machines with very little attention, thus effecting a great labor saving. A single operator can attend to a number of machines. A machine once started usually needs no further attention until the grinding or polishing process is completed. The machine then stops automatically, and the operator can, at any convenient time thereafter, reverse the sheet or insert a new sheet, and restart the machine.

The specific forms of grinding and polishing tables, for holding the glass sheets during the surfacing operations, are not claimed herein but forms the subject-matter of my copending applications, Serial Nos. 654,092 and 654,093, filed July 27, 1923.

Claims:

1. In an apparatus for surfacing sheet glass, a sheet-supporting table rotatable about a vertical axis, a surfacing element resting freely on the upper face of the sheet, means for rotating the table, means for raising and lowering the surfacing element to and from contact with the sheet, and automatic control mechanism for lowering the surfacing element into engagement with the sheet, starting the rotation of the table, and after a predetermined time elevating the surfacing element and stopping the table.

2. In an apparatus for surfacing sheet glass, a sheet-supporting table rotatable about a vertical axis, a surfacing element resting freely on the upper face of the sheet, means for rotating the table, an enclosing casing for the table and surfacing element having an opening giving access to the sheet, a closure for this opening, means for raising and lowering the surfacing element into or out of contact with the sheet, and for simultaneously moving the closure over or out of the opening.

3. In an apparatus for surfacing sheet glass, a sheet-supporting table rotatable about a vertical axis, a surfacing element resting freely on the upper face of the sheet, means for rotating the table, an enclosing casing for the table and surfacing element having an opening giving access to the sheet, a closure for this opening, means for raising and lowering the surfacing element into or out of contact with the sheet, and for simultaneously moving the closure over or away from the opening, and automatic control mechanism for lowering the surfacing element into engagement with the sheet, positioning the closure over the opening, and starting the rotation of the table, and after a predetermined time elevating the element, opening the closure and stopping the table.

4. In an apparatus for surfacing sheet glass, a sheet-supporting table rotatable about a vertical axis, a surfacing tool adapted to rest freely on the upper face of the sheet, means for rotating the table, an enclosing casing for the table and surfacing tool having an opening giving access to the sheet, a vertically slidable closure for this opening, means for simultaneously elevating the tool and lowering the closure or vice-versa, and automatic control means for lowering the tool into engagement with the sheet, elevating the closure over the opening, and starting the rotation of the table, and after a predetermined time elevating the tool, lowering the closure and stopping the table.

5. In an apparatus for surfacing sheet glass, a sheet-supporting table rotatable about a vertical axis, a surfacing element adapted to rest on the upper face of the sheet, means for rotating the table, means for raising and lowering the surfacing element to and from contact with the sheet, washing means for flooding the table top with water, and automatic control mechanism including means for controlling the washing means and for controlling said table and surfacing element whereby the table top and sheet are cleansed at the end of each grinding operation.

6. In an apparatus for surfacing sheet glass, a sheet-supporting table rotatable about a vertical axis, a surfacing tool adapted to rest on the upper face of the sheet, means for rotating the table, an enclosing casing for the table and tool having an opening giving access to the sheet, a closure for this opening, means for raising the surfacing tool and simultaneously opening the closure, or lowering the tool and simultaneously moving the closure over the opening, washing means for the table top, and automatic control mechanism for successively lowering the tool, closing the closure, starting the table rotating means and washing the table, then after a predetermined interval, raising the tool, washing the table, opening the closure and stopping the rotating means.

7. In an apparatus for surfacing sheet glass, a rotatable sheet-supporting table, a surfacing element adapted to rest freely when in operative position on the upper face of the sheet, an enclosing casing having an opening giving access to the sheet, a vertically movable closure for the opening, means for raising and lowering the surfacing element into or out of contact with the sheet, and flexible connections between the element and closure, whereby when the element is lowered the closure is raised and vice-versa.

8. In an apparatus for surfacing sheet glass, a sheet supporting table, a surfacing element, means for rotating the table, an enclosing casing for the table and surfacing element having an opening giving access to the sheet, a closure for this opening, means for controlling the surfacing element, and for controlling the closure.

9. In an apparatus for surfacing sheet glass, a sheet supporting table, a surfacing element, means for rotating the table, an enclosing casing for the table and surfacing element having an opening giving access to the sheet, a closure for this opening, means for operating the surfacing element and for simultaneously operating said closure and automatic control mechanism for the surfacing element, closure and table rotating means.

10. In an apparatus for surfacing sheet glass, a sheet supporting table, a surfacing tool, means for rotating the table, an enclosing casing for the table and surfacing tool having an opening giving access to the sheet, a slidable closure for said opening, means operatively connecting said tool and closure and automatic control means for the tool, closure and the table rotating means.

11. In an apparatus for surfacing sheet glass, a sheet supporting table, a surfacing element, means for rotating the table, means for operating the surfacing element, means for washing the table top with water and automatic control mechanism for the washing means and surfacing element for washing the table top between each grinding operation.

12. In an apparatus for surfacing sheet glass, a sheet supporting table, a surfacing tool, means for rotating the table, an enclosing casing for the table and tool having an opening giving access to the sheet, a closure for this opening, means operatively connecting said surfacing tool and closure, washing means for the table top, and automatic control mechanism for the tool, closure, table rotating means and table washing means.

Signed at Toledo, in the county of Lucas, and State of Ohio, this 25th day of August, 1923.

JOSEPH P. CROWLEY.